United States Patent
Eberhardt et al.

(10) Patent No.: US 6,712,376 B2
(45) Date of Patent: Mar. 30, 2004

(54) QUICK RELEASE CLAMP AND MOUNTING APPARATUS FOR DETACHABLY SECURING AN OBJECT TO A BICYCLE OR OTHER DEVICE

(76) Inventors: William J. Eberhardt, 39 Janey Avenue, North Bay, Ontario (CA), P1C 1N1; Bernard J. Graham, 120 Dugas Road, Corbeil, Ontario (CA), P0H 1K0

( * ) Notice: Subject to any disclaimer, the term of this patent is extended or adjusted under 35 U.S.C. 154(b) by 0 days.

(21) Appl. No.: 10/152,721

(22) Filed: May 23, 2002

(65) Prior Publication Data
US 2003/0218311 A1 Nov. 27, 2003

(51) Int. Cl.[7] ............................................... B62H 7/00
(52) U.S. Cl. ..................................... 280/293; 280/288.4
(58) Field of Search ........................... 280/288.4, 292, 280/293, 304.5; 403/110, 289, 290, 342, 343, 374.1, 374.2

(56) References Cited

U.S. PATENT DOCUMENTS

| | | | |
|---|---|---|---|
| 3,650,544 A | 3/1972 | Cassell ........................... 280/293 |
| 4,134,364 A * | 1/1979 | Boncela ........................ 119/703 |
| 4,928,985 A | 5/1990 | Nowlin ........................ 280/204 |
| 5,154,096 A | 10/1992 | Geller ........................... 74/551.8 |
| 5,215,037 A * | 6/1993 | Allred ........................... 119/771 |
| 5,215,231 A * | 6/1993 | Paczonay ...................... 222/610 |
| 5,259,638 A | 11/1993 | Krauss et al. ................. 280/293 |
| 5,303,944 A | 4/1994 | Kalmus ...................... 280/288.4 |
| 5,359,992 A * | 11/1994 | Hori et al. ........................ 126/4 |
| 5,549,499 A * | 8/1996 | Foskey et al. ................. 446/268 |
| 5,564,726 A | 10/1996 | Hearn ........................... 280/293 |
| 5,577,750 A | 11/1996 | Sklar ............................. 280/293 |
| 5,704,526 A * | 1/1998 | Kuo ............................... 224/425 |
| 5,737,974 A * | 4/1998 | Chen .............................. 74/551.1 |
| 5,842,710 A * | 12/1998 | Couture ........................ 280/204 |
| 5,890,759 A | 4/1999 | Ross ........................ 297/195.13 |
| 5,908,187 A * | 6/1999 | Kalkoske et al. .............. 248/635 |
| 5,915,711 A | 6/1999 | Seiple ............................ 280/293 |
| 5,975,549 A | 11/1999 | Ockenden ..................... 280/240 |
| 6,120,050 A | 9/2000 | Tillim ............................ 280/293 |
| 6,431,422 B1 * | 8/2002 | Moore et al. .................. 224/427 |
| 6,488,302 B2 * | 12/2002 | Coates ........................... 280/293 |

* cited by examiner

Primary Examiner—Lesley D. Morris
Assistant Examiner—L. Lum
(74) Attorney, Agent, or Firm—Merek, Blackmon & Voorhees, LLC (57) ABSTRACT

A quick release clamping mechanism for securing a sleeve about a tubular structure or post where the sleeve has first and second outwardly projecting lugs that may drawn together toward one another to compress the sleeve. Each of the lugs has a bore extending therethrough and is positioned on the sleeve such that the bores are generally aligned with one another. The bore on the first lug is internally threaded. The clamping mechanism comprises an elongate bolt member receivable through the bores in the lugs. The bolt member has a first threaded end that threadably engages the threaded bore through the first lug. The clamping mechanism further comprises a tensioning member operable between an engaged and a disengaged position. When in its engaged position the tensioning member bears against the second lug and draws the first lug toward the second lug to compress the sleeve. When in its disengaged position the tensioning member releases the force drawing the first lug toward the second lug. The amount of compressive force applied by the tensioning member is adjustable through threading the first end of the bolt member into or out of the threaded bore in the first lug.

23 Claims, 12 Drawing Sheets

QUICK RELEASE CLAMP AND MOUNTING APPARATUS FOR DETACHABLY SECURING AN OBJECT TO A BICYCLE OR OTHER DEVICE

FIELD OF THE INVENTION

This invention relates generally to a quick release clamp and mounting apparatus that may be used to detachably or releasably secure an object to a bicycle, tricycle, or other device.

BACKGROUND OF THE INVENTION

A variety of mechanisms have been developed for securing to the frame or a structural member of a bicycle, tricycle or other device in order to allow objects to be secured thereto. With respect to bicycles and tricycles such mechanisms include bicycle carrier brackets, fender supports, lighting brackets, horn or bell mounting systems, and training or rider assistance supports. Typically devices such as these are used to rigidly secure an object to a bicycle frame or other structural member through the use of bolts, screws, or other fasteners. Since bicycles are often subjected to a considerable amount of vibration during their use, the fasteners are normally tightly secured to the bicycle's frame through the use of hand tools so that the fasteners do not vibrate loose. Accordingly, in such cases the objects effectively become permanently attached to the bicycle. While securing objects to a bicycle in this fashion ensures that they remain in their intended position and configuration adjacent to the bicycle's frame, it does not readily allow for the object to be released without considerable effort, or without the use of tools.

As mentioned, one example of a device that may be attached to a bicycle or tricycle through the use of a rigid mounting mechanism of the general type described above is a riding or training support. These supports typically comprise a pole or bar that extends from the bicycle's frame to present a handle or grip which an adult can hold to help steady and control a novice or beginner rider. Such bars are most often rigidly attached or fixed to the frame of the bicycle to allow the bicycle to be steadied by grasping the handle or grip portion. While rigidly fixing the bar to the frame assists in controlling or steadying the bicycle it also makes the bar difficult to remove when it is no longer needed, or when the bicycle is to be stored for an extended length of time.

An alternate method of fastening a training or support bar to a bicycle or tricycle is shown in U.S. Pat. No. 5,303,944. Here a pivoting or rotatable connection is used to attach a training bar to the bicycle's frame. While the device permits the training bar to be removed from the bicycle when no longer required, it also allows for rotational movement (in a general horizontal plane) between the bar and its mount, a feature that in some applications may be undesirable as it limits the amount of control that can be exercised over the bicycle.

A further limitation of quick release clamps and mounting mechanisms concerns the ability for such devices to be over tightened by an operator to the extent that the clamping mechanism or a portion thereof becomes structurally deformed. For example, many such devices include a sleeve-like or clam shell form of clamping structure that is made to be compressed about a tubular post or frame member. The sleeve typically has a pair of outwardly projecting lugs that may be drawn together to compress the sleeve about the post or frame member. An excessive amount of force applied to the lugs can deform them making it difficult to subsequently remove or adjust the clamping mechanism. The inherent limitation in such prior designs lies in the fact that they tend to actively draw the lugs together such that the sleeve is compressed about the frame member and passively allow the lugs to return to their normal position by means of their own inherent resiliency after the force tending to draw them together has been removed. Unfortunately, if the force applied to the lugs is excessive they will be deformed to the point where their natural resiliency will be insufficient to return them to their original positions once the applied force has been removed.

There is therefore a need for an improved quick release clamp and mounting apparatus that is able to detachably secure an object to a bicycle, tricycle or other device. The apparatus should rigidly hold the object in place and should help to prevent relative movement between the object and the bicycle's frame or the structural member to which it is attached. Further, the mounting apparatus should provide a mechanism by which the object may be releaseably detached from the bicycle or other device quickly, effortlessly, and without the use of hand tools. Finally, it would also be preferable if the device were able to not only actively be secured about a frame or structural member through the application of a clamping force, but that it also be able to actively apply a force in the opposite direction to allow the apparatus to be opened and easily adjusted or removed.

SUMMARY OF THE INVENTION

The invention therefore provides a quick release clamp and mounting apparatus for detachably securing an object to a bicycle, tricycle or other device. Through the application of a clamping force the invention permits the object to be rigidly secured in a manner that holds the object in place about the bicycle or other device and that also helps to prevent relative movement between the object and the device to which it is attached. The invention further allows for the object to be easily and readily removed, through the application of a force opposite to the clamping force.

Accordingly, one of its aspects the invention provides a quick release clamping mechanism for securing a sleeve about a tubular structure or post, the sleeve having first and second outwardly projecting lugs that may drawn together toward one another to compress the sleeve about the tubular structure or post, each of the lugs having a bore extending therethrough and positioned upon said sleeve such that the bores are generally aligned with one another, the bore on the first lug internally threaded, the clamping mechanism comprising an elongate bolt member receivable through said bores in said lugs, said bolt member having a first threaded end that threadably engages the threaded bore through the first lug to secure said bolt member thereto; and, a tensioning member, said tensioning member operable between an engaged and a disengaged position, when in said engaged position said tensioning member bearing against said second lug and drawing said threaded end of said bolt member and said first lug to which it is secured toward said second lug thereby compressing the sleeve, when in said disengaged position said tensioning member releasing said force drawing said first lug toward said second lug, the amount of compressive force applied by said tensioning member adjustable through threading said first end of said bolt member into or out of the threaded bore through the first lug.

In a further aspect the invention provides a mounting apparatus for detachably securing an object to a bicycle, a tricycle, or other device, the apparatus comprising a first clamp in the form of a sleeve compressibly receivable about a tubular or post structure, said sleeve having first and second outwardly projecting lugs that may be drawn toward one another to compress said sleeve, each of said lugs having a bore extending therethrough and positioned about said sleeve such that the bores are generally aligned with one another, said bore through said first lug having an internal thread; a second clamp releasably securable to an object to be attached to the bicycle or other device; a connecting member joining said first clamp to said second clamp in a fixed spaced-apart relationship so as to off-set an object secured to the bicycle or other device by said second clamp at a fixed distance from the tubular or post structure to which said first clamp may be attached; and, a quick release clamping mechanism including an elongate bolt member receivable through said bores in said first and second lugs, said bolt member having a first threaded end that threadably engages said threaded bore through said first lug, said quick release clamping mechanism having an engaged and disengaged position, when in said engaged position said clamping mechanism drawing said first and second lugs together to compress said sleeve about the tubular or post structure of the bicycle or other device, when in said disengaged position said quick release clamping mechanism releasing said compressive force applied to said lugs, the amount of compressive force applied by said quick release clamping mechanism adjustable through threading said first end of said bolt member into or out of said threaded bore in said first lug.

In yet a further aspect the invention provides a mounting apparatus for detachably securing a training support bar to a bicycle or a tricycle, the training support bar having an elongate handle with a first end securable to the mounting apparatus, the training support bar assisting in providing balance and stability to a rider on the bicycle or tricycle, the mounting apparatus comprising a first clamp releasably securable to the frame or a structural member of the bicycle or tricycle; a second clamp in the form of a sleeve compressively receivable about said first end of said training support bar, said sleeve having first and second outwardly projecting lugs that may be drawn toward one another to compress said sleeve about said first end of said training support bar, each of said lugs having a bore extending therethrough and positioned about said sleeve such that said bores are generally aligned with one another, said bore through said first lug having an internal thread; a connecting member joining said first clamp to said second clamp in a fixed and spaced-apart relationship so as to position the training support bar at a fixed distance from the frame of the bicycle or tricycle to which said first clamp is attached; and, a quick release clamping mechanism including an elongate bolt member receivable through said bores in said first and second lugs of said second clamp, said bolt member having a first threaded end that threadably engages said threaded bore through said first lug, said quick release clamping mechanism operable to apply and release a compressive force to said lugs and thereby releasably secure said first end of said training support bar within said second clamp, the amount of compressive force applied by said quick release clamping mechanism adjustable through threading said first end of said bolt member into or out of said threaded bore in said first lug.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which:

FIG. 2a is an upper perspective exploded view of the mounting apparatus and the training support bar shown in FIG. 1;

FIG. 2b is an enlarged detail view of the mounting apparatus shown in FIG. 2a;

FIG. 3a is a partial longitudinal sectional view taken through the quick release mechanism of the mounting apparatus shown in FIG. 1;

FIG. 3b is a detail view of the handle portion shown in FIG. 3a;

FIG. 3c is an alternate embodiment of the quick release mechanism shown in FIG. 3a;

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

In the attached drawings the mounting apparatus in accordance with a preferred embodiment of the present invention is noted generally be reference numeral 1. For purposes of illustration, in the drawings mounting apparatus 1 is shown as attached to a bicycle 2. However, it will be appreciated by those skilled in the art that mounting apparatus 1 could equally be secured or attached to a tricycle or any one of a very wide variety of other wheeled vehicles, or other devices in general. Mounting apparatus 1 may be used where there is a need or desire to provide a mechanism that allows an object to be detachably secured to a device, while enabling the object to be rigidly held in place in order to help prevent relative movement between the object and the device to which it is attached.

With particular reference to FIGS. 1 through 5, mounting apparatus 1 is comprised generally of a first clamp 3, a second clamp 4, and a connecting member 5 joining the first and second clamps together in a fixed and spaced-apart relationship. As will be described in more detail below, first clamp 3 is attachable to the frame or a structural member of bicycle 2 to enable mounting apparatus 1 to be securably fixed thereto. Second clamp 4 is designed such that it is able to releasably hold an object that is desired to be attached to the bicycle. As shown particularly in FIG. 4, connecting member 5 joins the first and second clamps together in a relationship such that an object releasably secured by second clamp 4 is off-set by a fixed distance from the bicycle's frame or structural member to which first clamp 3 is attached. Furthermore, in a preferred embodiment connecting member 5 joins second clamp 4 to first clamp 3 at an inclined angle so that an object that is releasably secured within second clamp 4 is held in an inclined configuration relative to first clamp 3, and relative to the frame or structural member of the bicycle to which the first clamp is attached. For strength and rigidity, connecting member 5 is preferably tubular and formed from metal.

Since the function of first clamp 3 is to securely attach mounting apparatus 1 to the frame or a structural member of bicycle 2, its construction will vary according to the particular portion of the frame or the structural member to which it is designed to be secured. In the embodiment shown in the attached drawings, first clamp 3 is adapted to be attached to the seat post 6 of bicycle 2. In this embodiment clamp 3 is of a generally clam shell configuration, having a pair of opposed arm members that each generally form one half of a hollow right angled cylinder. In this manner arm members 7 and 8 maybe received and secured around the generally cylindrical exterior surface of seat post 6. A pair of lugs 9 and 10 extend outwardly from the ends of arm members 7 and 8. Each lug preferably has a bore extending therethrough such that a bolt or other fastener 11 may be inserted through the lugs and used to tightly compress arm members 7 and 8 about seat post 6, thereby securely attaching mounting apparatus 1 to bicycle 2. Where fastener 11 is a threaded bolt, preferably a washer 12 and a nut 13 are received over its threaded end. To prevent a loosening of the bolt due to vibration of the bicycle, washer 12 may be lock washer and/or nut 13 may be a lock nut.

Figure 1:
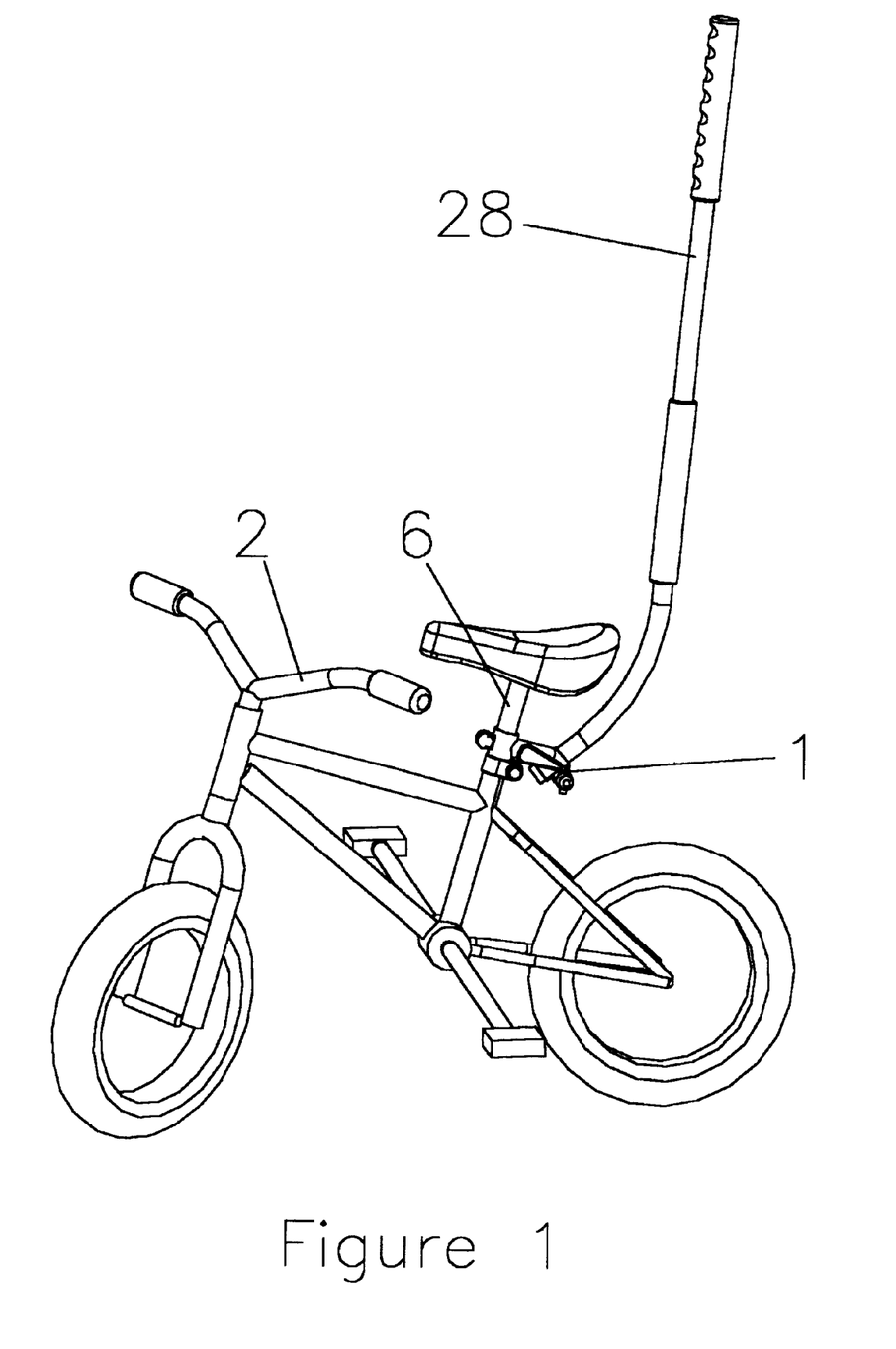
FIG. 1 is a side elevational view of a bicycle having attached thereto the mounting apparatus in accordance with one embodiment of the present invention wherein the mounting apparatus is shown securing a training support bar to the bicycle.
Figures 2A, 2B:
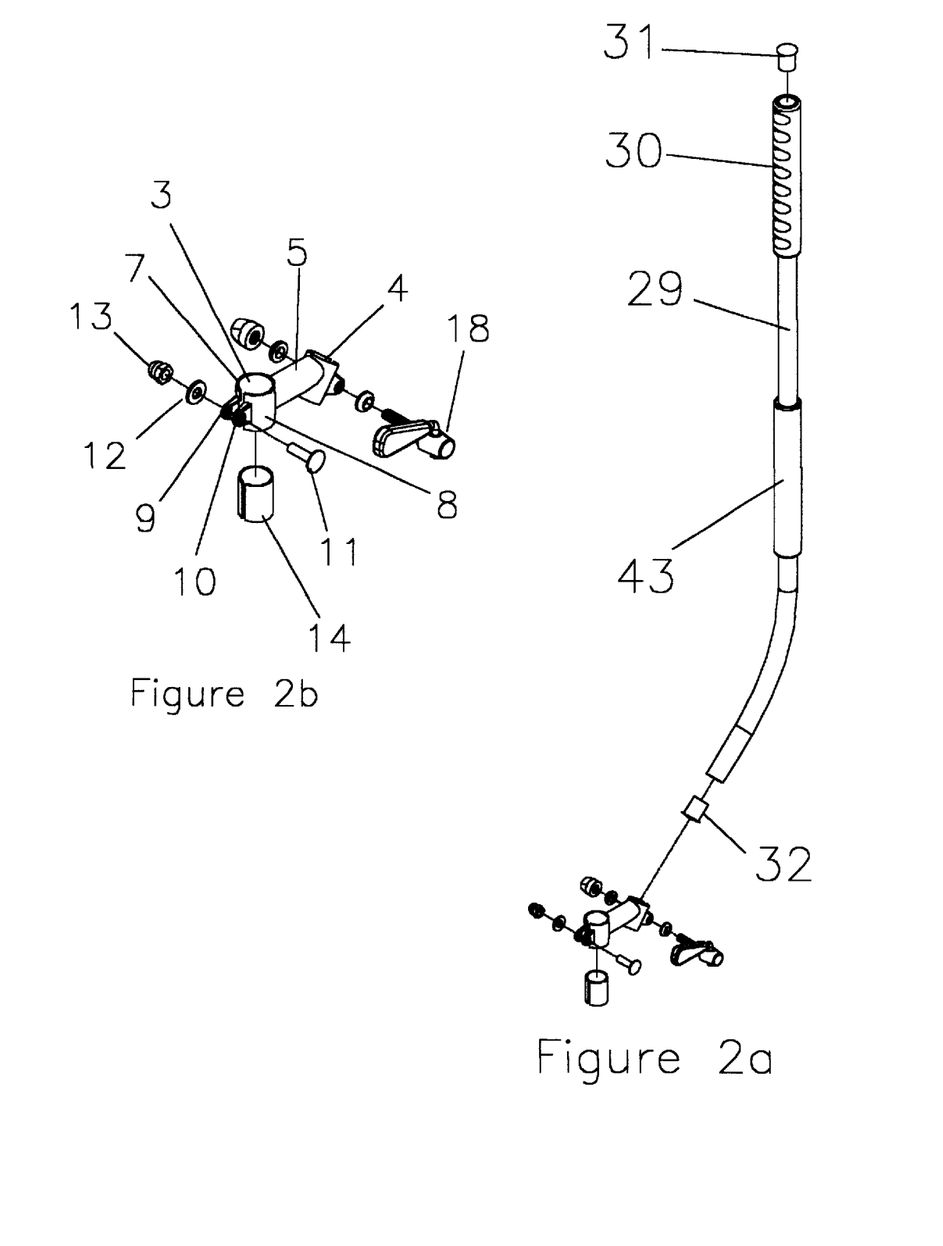

In an alternate embodiment to that shown in FIG. 2, one of lugs 9 and 10 could include a threaded bore into which a stud may be threaded in order to secure arms in 7 and 8 about seat post 6. First clamp 3 may also include a split sleeve member 14 that is receivable around seat post 6 and about which arms 7 and 8 may be secured in order to help accommodate seat posts or frame or structural members having different outside diameters or cross-sectional shapes.

In the embodiment of the invention shown in the attached drawings, second clamp 4 has a general overall structure similar to that of first clamp 3. In particular, second clamp 4 includes a pair of opposed arm members 15 and 16, each having a shape generally conforming to one half of a right angled cylinder such that they together form a generally cylindrical opening 17 for receiving an object or a portion thereof. Second clamp 4 further includes a quick release mechanism 18 having an open and a closed position. When in its open position quick release mechanism 18 allows an object or a portion thereof to be received within or removed from opening 17 by maintaining arms 15 and 16 at a position spaced apart from one another by a sufficient degree to allow for the receipt or removal of the object. When quick release mechanism 18 is moved to its closed position second clamp 4 is compressed about opening 17 by drawing arms 15 and 16 toward one another to thereby releasably secure an object, or portion thereof, to mounting apparatus 1. Quick release mechanism 18 and second clamp 4 serve the further function of limiting relative movement between the object and mounting apparatus 1 when quick release mechanism 18 is in its closed position with arms 15 and 16 secured about the portion of the object received within opening 17.

In one preferred embodiment of the invention, quick release mechanism 18 is comprised of a cam actuated bolt member 19. Cam actuated bolt member 19 is generally in the form of a bolt or rod 20 that is received through bores extending through a pair of lugs 21 and 22 that extend outwardly from the ends of arm members 15 and 16 of second clamp 4. A head portion 23 and a nut or a stopper 24 are secured about opposite ends of bolt or rod 20 in order to maintain cam actuated bolt member in position through lugs 21 and 22. A pair of washers or spacers 25 are preferably received over the bolt and positioned between lugs 21 and 22 and head portion 23 and nut 24. A spacer sleeve 41 helps to prevent over tightening of second clamp 4.

Figures 3A, 3B:
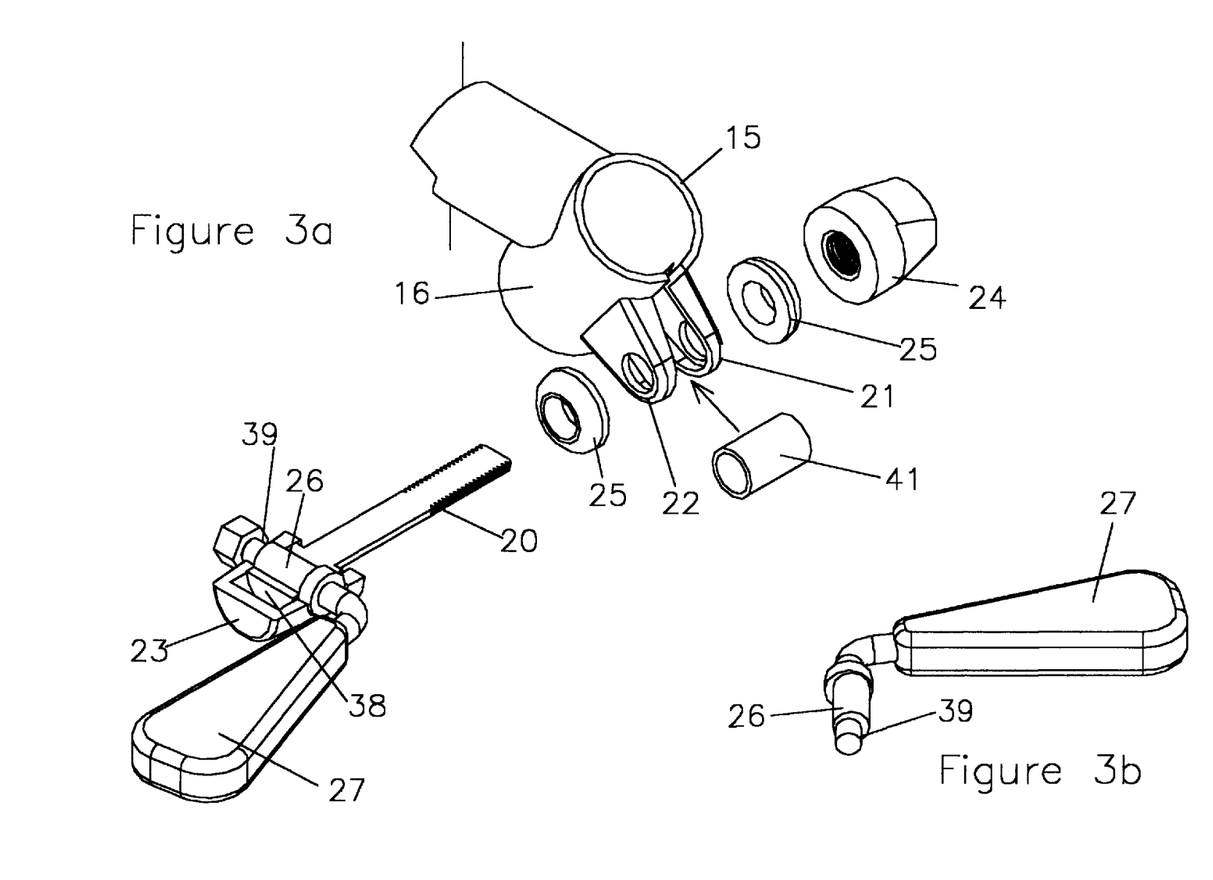

As shown in FIG. 3a, head portion 23 of quick release mechanism 18 is generally comprised of a hollow cylindrical member that is received about a first end 38 of bolt 20. The hollow interior of head portion 23 is dimensioned so as to enable first end 38 to slide longitudinally therein. A pair of opposed bores extend through the side surface of head portion 23 such that a cylindrical member 26 may be received through the head portion. Cylindrical member 26 is mounted upon a shaft 39 having an axis that is parallel but off-set to that of cylindrical member 26 such that rotation of the shaft causes member 26 to effectively operate as a cammed surface. A handle 27 is preferably connected to one end of shaft 39 to enable cylinder 26 to be rotated within head portion 23. A nut 40 is attached to the opposite end of shaft 39 to retain member 26 within head portion 23.

As is also indicated in FIG. 3a, when cylindrical member 26 is received within head portion 23 it passes through a bore extending laterally through bolt or rod 20. Rotation of cylindrical member 26 through application of a force to handle 27 will therefore cause the surface of member 26 to rotate and to act as an cam causing movement of bolt 20 either into or out of the hollow interior of head portion 23.

In this fashion, with bolt 20 received through lugs 21 and 22 of arms 15 and 16, and with nut or stopper 24 secured to the opposite end of the bolt, in one respect movement of handle 27 will have the effect of shortening the relative distance between head portion 23 and nut or stopper 24, thereby tending to compress lugs 21 and 22 together. Alternatively, in another respect movement of handle 27 will tend to effectively lengthen bolt 20 and thereby remove a compressive force previously applied by cam actuated bolt member 19 to arms 15 and 16. Cam actuated bolt member 19 is thus capable of compressing second clamp 4 about opening 17 to releasably secure an object within the opening.

Figure 3C:
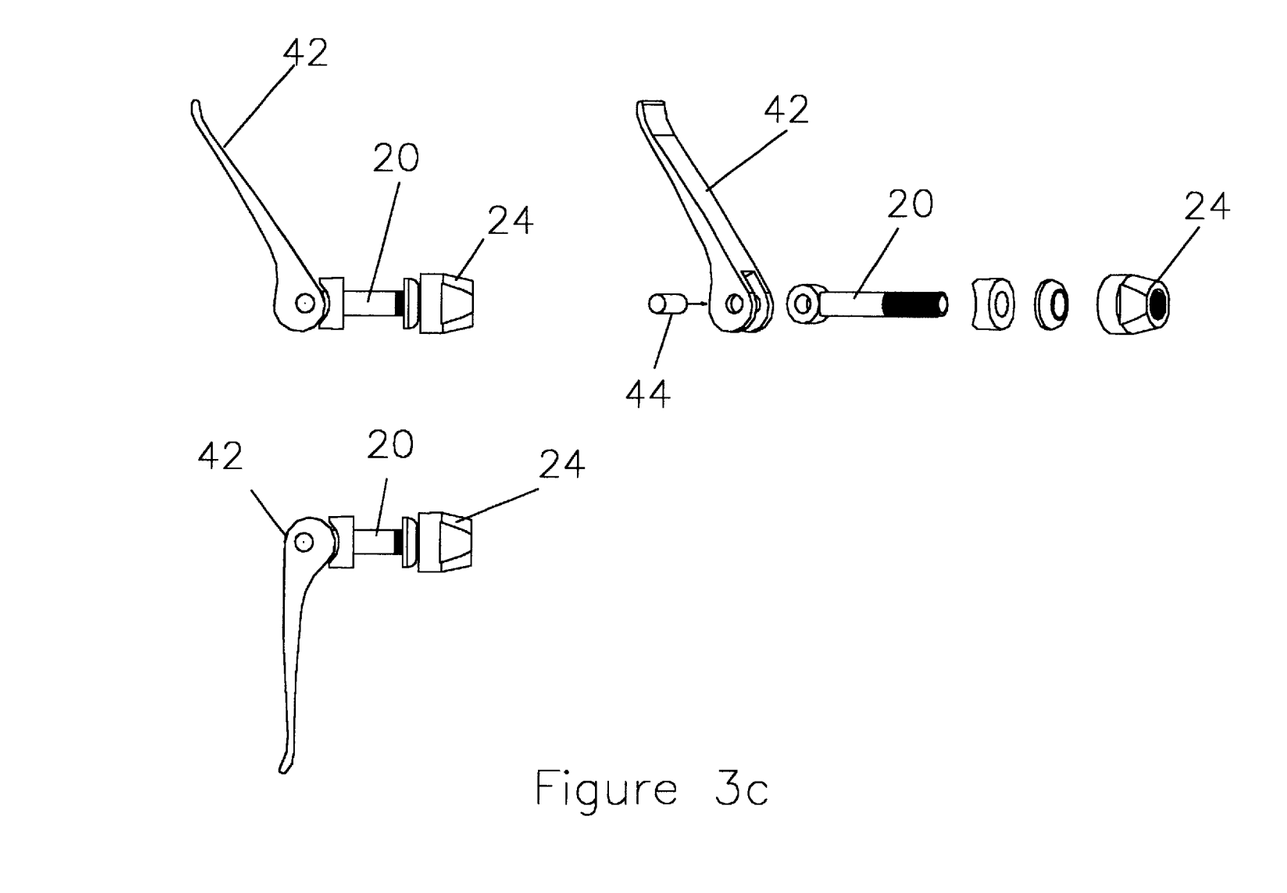
Figure 4:
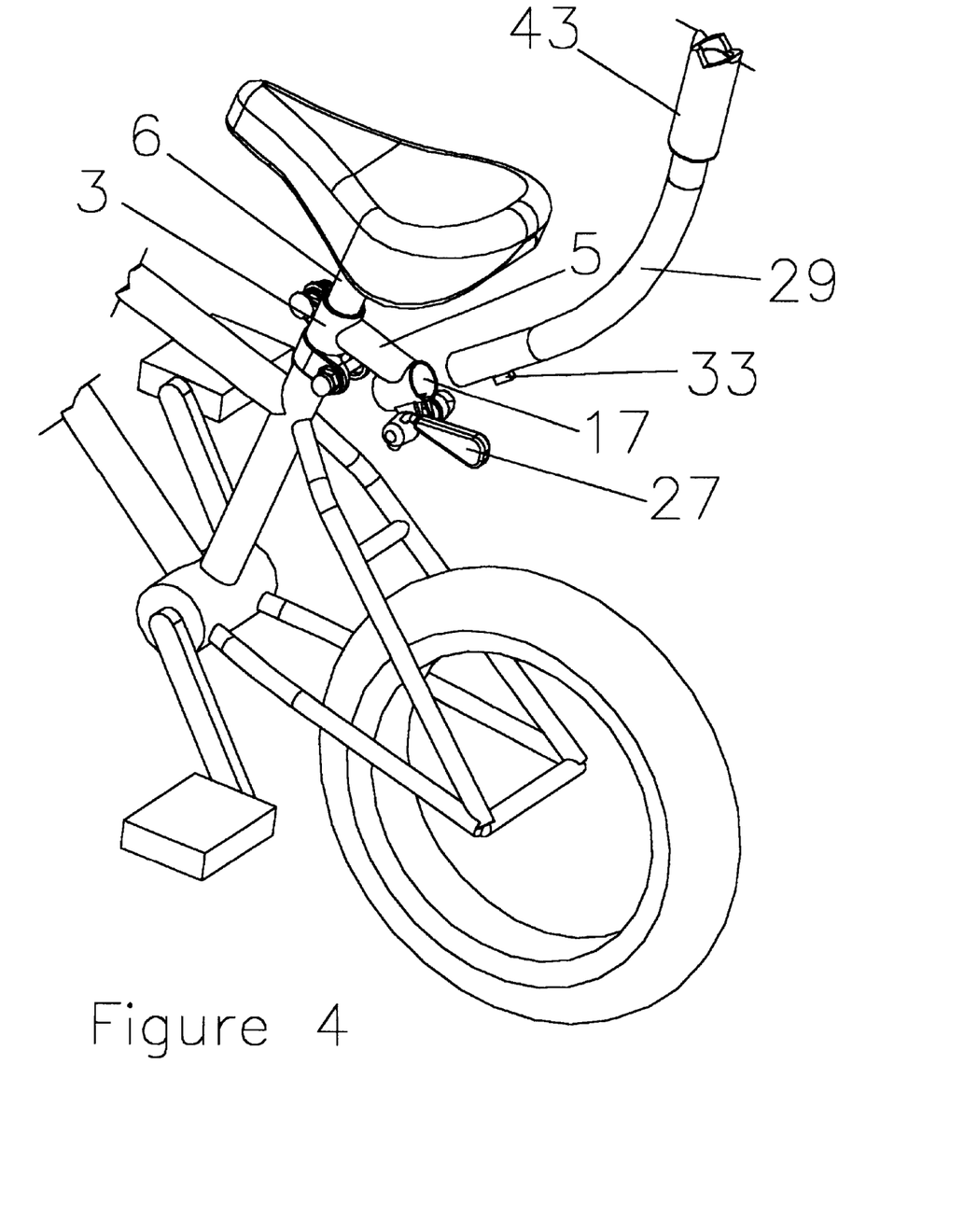
FIG. 4 is a partial upper rear perspective view of the bicycle shown in FIG. 1 wherein the training support bar has been removed from the mounting apparatus.
Figure 5:
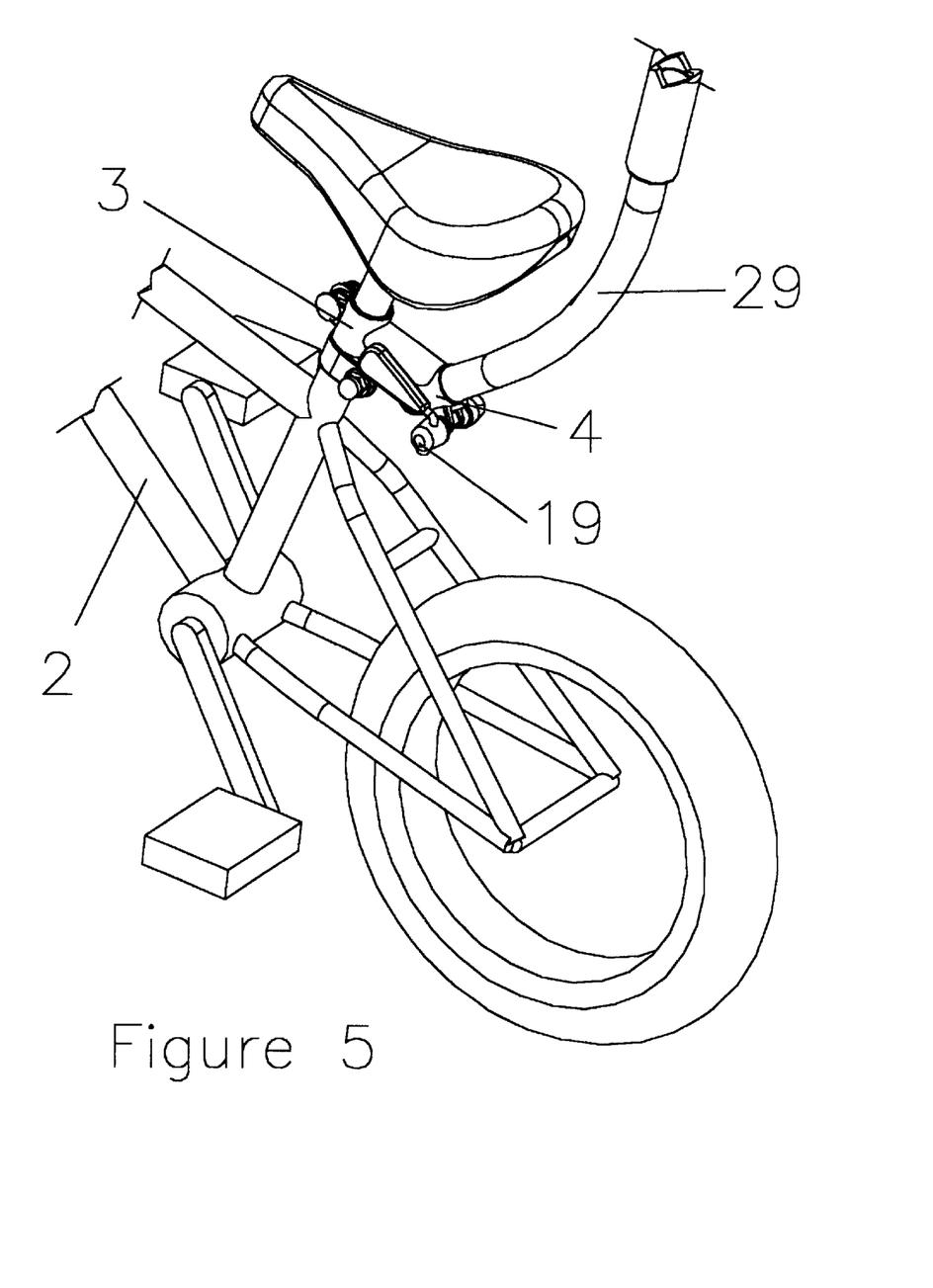
FIG. 5 is a partial rear side perspective view of the bicycle and the mounting apparatus and training support bar shown in FIG. 1.
Figure 6:
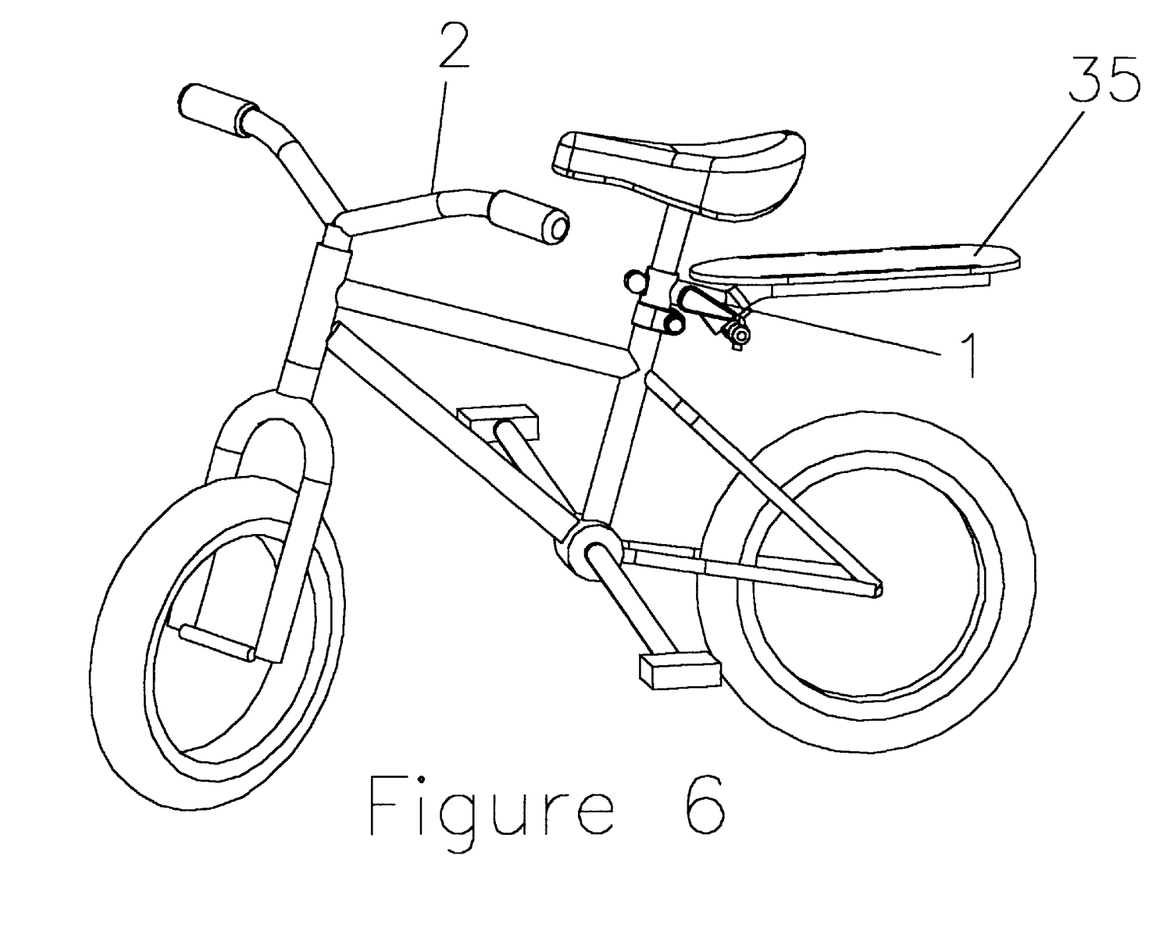
FIG. 6 is a side elevational view of a bicycle having attached thereto a mounting apparatus in accordance with one embodiment of the present invention wherein the mounting apparatus is shown securing a bicycle carrier to the bicycle's frame.
Figure 7:
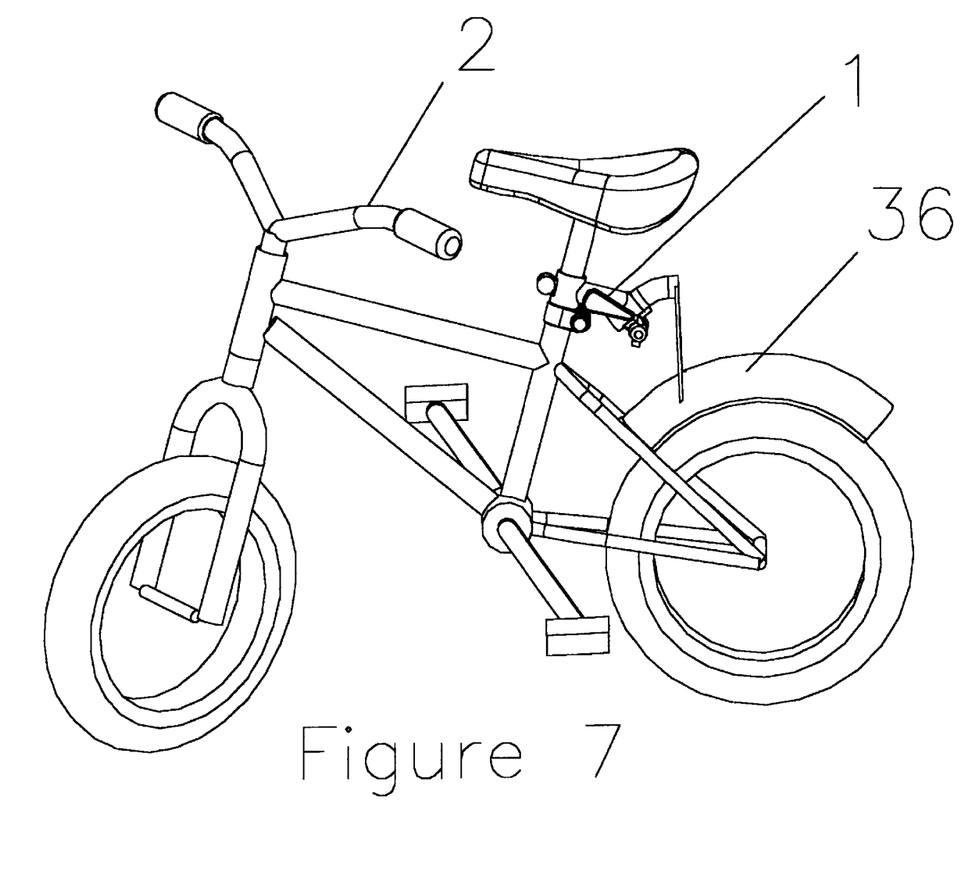
FIG. 7 is a side elevational view of a bicycle having attached thereto a mounting apparatus in accordance with one embodiment of the present invention wherein the mounting apparatus is shown securing a bicycle fender to the bicycle's frame.
Figure 8:
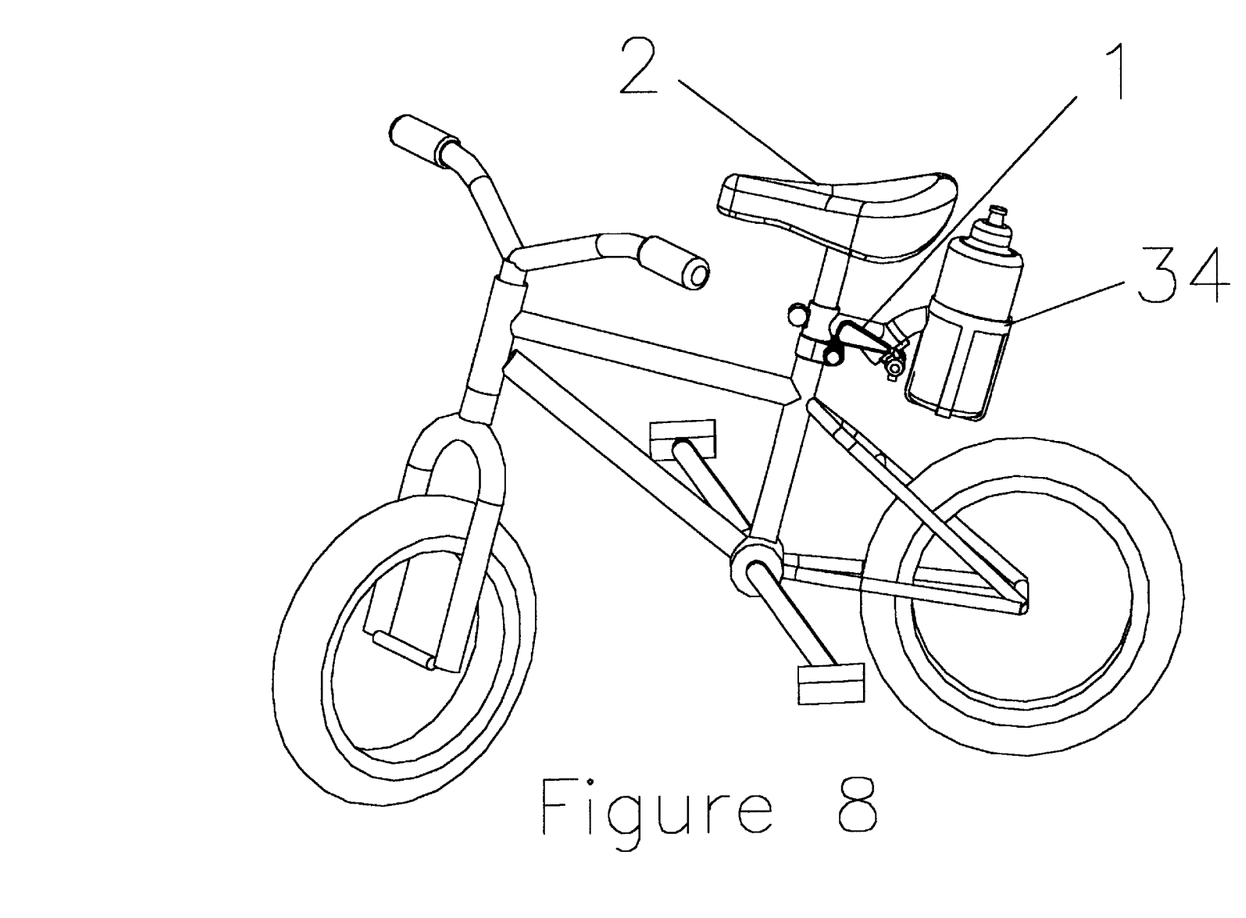
FIG. 8 is a side elevational view of a bicycle having attached thereto a mounting apparatus in accordance with one embodiment of the present invention wherein the mounting apparatus is shown securing a water bottle holder and water bottle to the bicycle's frame.
Figure 9:
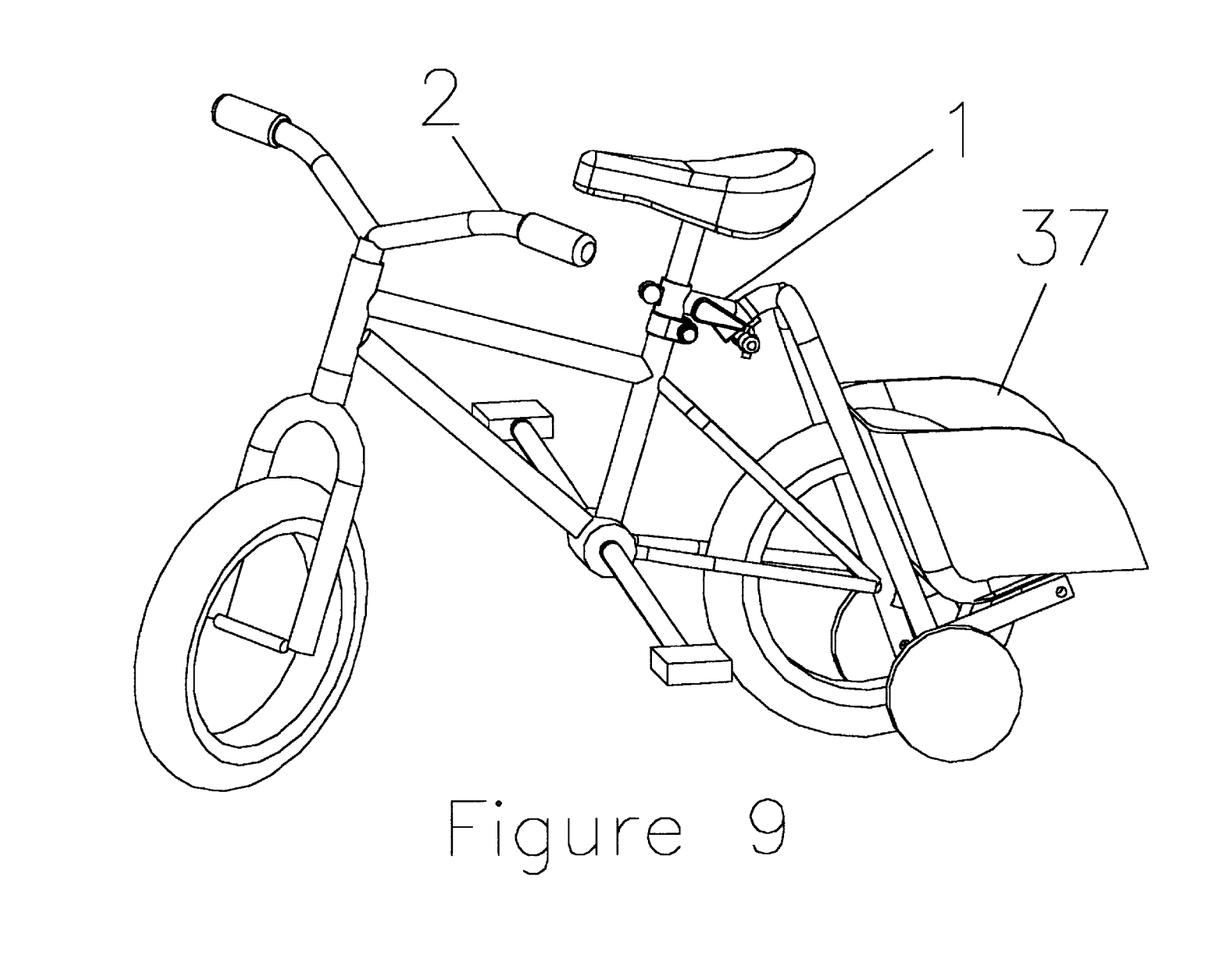
FIG. 9 is a side elevational view of a bicycle having attached thereto a mounting apparatus in accordance with one embodiment of the present invention wherein the mounting apparatus is shown securing a wagon to the bicycle's frame.

FIG. 3c shows an alternate embodiment of the invention wherein quick release mechanism 18 generally comprises a handle member 42 having a cammed exterior surface. Handle 42 is rotatably connected to bolt or rod 20 by a pin 44 such that rotation of the handle causes its cammed exterior surface to effectively either lengthen or shorten bolt 20.

The degree of compression that may be applied by cam actuated bolt member 19 to second clamp 4 can be adjusted through tightening or loosening nut 24 about bolt 20. Tightening the nut about the bolt will have the effect of reducing the distance between nut 24 and head portion 23, such that rotation of cylinder member 26 will squeeze arms 15 and 16 of second clamp 4 together with a greater force. Similarly, loosening nut 24 will have the opposite effect. The amount of compression applied to second clamp 4 can thus be adjusted as necessary for holding different devices. That is, where there is a desire to limit or prevent relative movement between an object and mounting apparatus 1, cam actuated bolt member 19 may be adjusted in order to allow a relatively high degree of compression to be applied to second clamp 4 so as to securely hold the object therein and prevent movement between the various parts.

In the embodiment of the invention shown in FIGS. 1, 2, 4 and 5, the device detachably secured to mounting apparatus 1 is a training support bar 28. Support bar 28 is comprised generally of an elongate handle 29 having a gripping portion 30 at an upper end, and a generally cylindrical opposed lower end for receiving within opening 17 of second clamp 4. A pad 43 may be received about support bar 28 to protect the back and head of a rider. Where handle 29 is hollow, a cap 31 may be inserted into the upper end of the handle adjacent to grip 30 and a bushing or sleeve 32 may be placed within the lower end of the handle that is received within second clamp 4. Bushing or sleeve 32 serves the function of adding rigidity to the end of training support bar 28 such that when compressed within opening 17 of second clamp 4 the support bar is not squashed or deformed.

In one preferred embodiment of the invention, arm members 15 and 16 are designed such that when they are compressed together about a training support bar or other object received within opening 17, a small longitudinal channel is formed between lugs 21 and 22. Where the object held by second clamp 4 is a training support bar the lower end of handle 29 preferably includes an outwardly extending tab 33 that is received within the channel formed between lugs 21 and 22. In this manner when quick release mechanism 18 is in its closed or locked position, with second clamp 4 compressed about the end of handle 29, the receipt of tab 33 within the channel between opposed lugs 21 and 22 will provide further assistance to prevent rotational movement of handle 29 relative to mounting apparatus 1. Tab 33 also provides a visual means to indicate to a user when handle 29 has been sufficiently inserted into opening 17 to ensure that clamps 4 will adequately hold the handle in place.

From an understanding of the structure and function of mounting apparatus 1, it will be apparent that the apparatus provides a mechanism by which an object may be detachably secured to a bicycle, tricycle or other device. The mounting apparatus provides a structure that holds an object in place about the bicycle or other device, and that also helps prevent relative movement between the object and the device to which it is secured. Second clamp 4 allows the object to be easily and readily removed when no longer required. Where the object is a training support bar to be secured to a bicycle, prevention of relative movement between the support bar and bicycle's frame enhances the ability to provide support and balance to a novice or beginner rider. Furthermore, and as shown in the attached drawings, connecting member 5 is preferably of a sufficient length such that when first clamp 3 is attached to seat post 6 of bicycle 2, second clamp 4 is positionable beneath the rearward aspect of the bicycle's seat such that it does not extend in a vertical plane beyond the rear most portion of the seat. In this manner mounting apparatus 1 will not interfere with an individual mounting the bicycle, nor will the individual's clothes tend to catch upon mounting apparatus 1 when the rider is sitting on the seat. The inclination of second clamp 4 relative to first clamp 3 also assists in directing an object secured within the second clamp away from the bicycle's seat so as to not interfere with either the seat or a rider sitting thereon.

As indicated in FIGS. 6 through 9, mounting apparatus 1 not only provides the ability to releasably secure a training support bar to a bicycle or other device, but also may be used to detachably secure a wide variety of addition articles, including a water bottle 34, a carrier 35, a fender 36 or a wagon 37.

Figure 10:
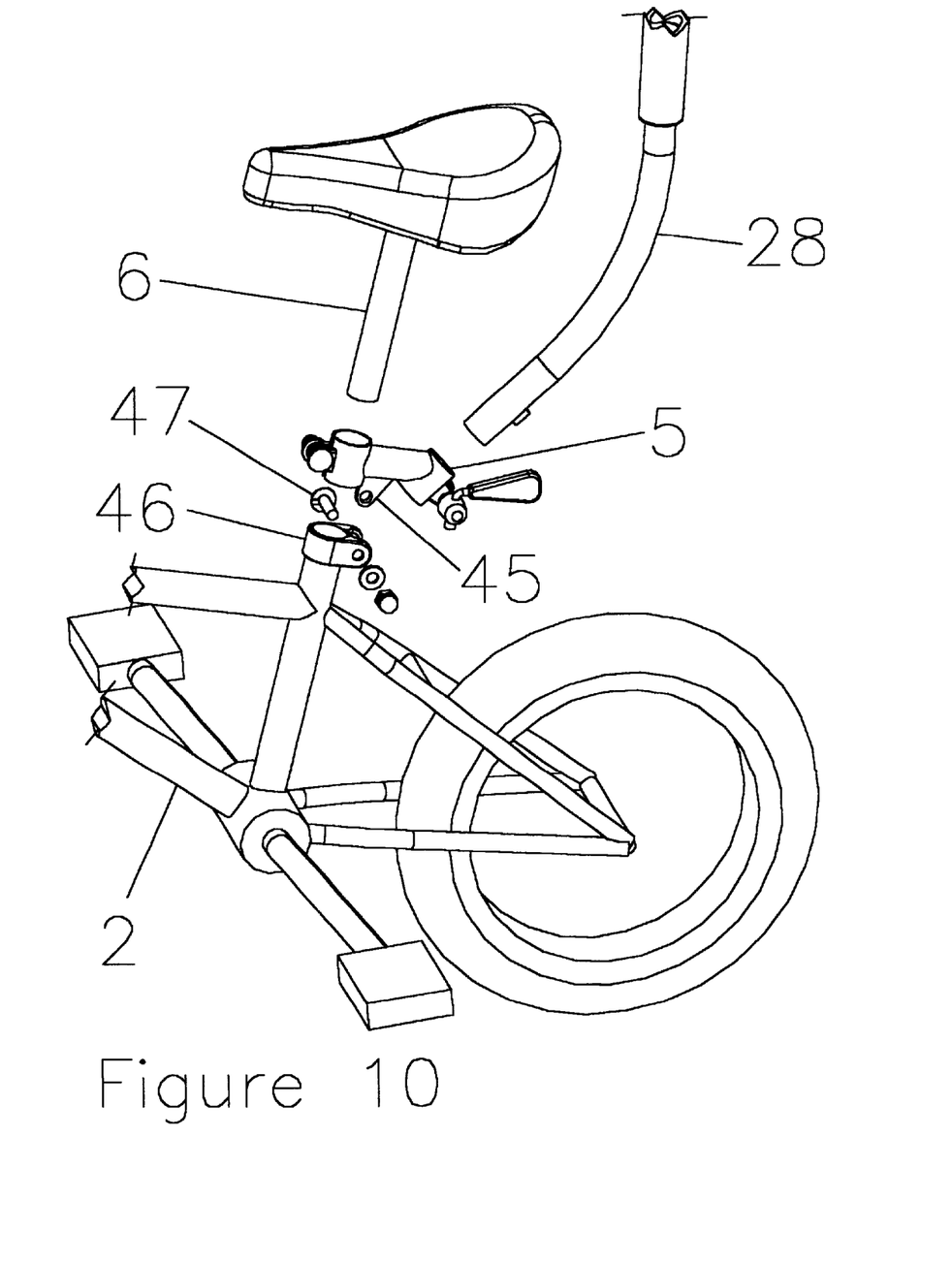
FIG. 10 shows a further embodiment of the invention wherein the mounting apparatus includes a flange to enhance the strength and rigidity of the attachment of the mounting apparatus to a bicycle or other device.

A further embodiment of the present invention is shown in FIG. 10. Here mounting apparatus 1 includes a flange 45 that assists in establishing and maintaining a rigid connection between the mounting apparatus and the bicycle. In this embodiment flange 45 preferably includes a bore that can be aligned with the bicycle's seat clamp 46 such that a bolt 47 used to compress seat clamp 46 together is capable of also passing through flange 45 when mounting apparatus 1 is positioned about seat post 6. In this manner flange 45 will serve the dual function of helping to locate mounting apparatus 1 directly above seat clamp 46 as well as assisting in rigidly securing the mounting apparatus to the bicycle's frame. A load or torque applied to the mounting apparatus will thus be transmitted directly to the bicycle's frame through flange 45. The transference of a load through flange 45 removes the amount of load that is applied to seat post 6 and helps remove the potential for damage to the seat post when excessive loads are applied to the mounting apparatus (for example where a rider is about to fall but is held in an upright position by a supervisor firmly holding onto training support bar 28). In addition, the increased rigidity provided by flange 45 enhances the amount of control that a supervisor is capable of exercising over a bicycle and novice rider through the use of a training support bar.

It will be appreciated by those skilled in the art that a variety of additional mechanisms could be employed to help prevent relative movement between mounting apparatus 1 and the device secured thereto. Such mechanisms include the use of a knurled surface about the end of handle 29 and the use of other friction enhancing treatments or mechanisms positioned between the end of the handle and the interior surface of opening 17 in second clamp 4. Further, tab 33 may be received within a separate channel formed within second clamp 4, as opposed to being received between lugs 21 and 22.

Figure 11:
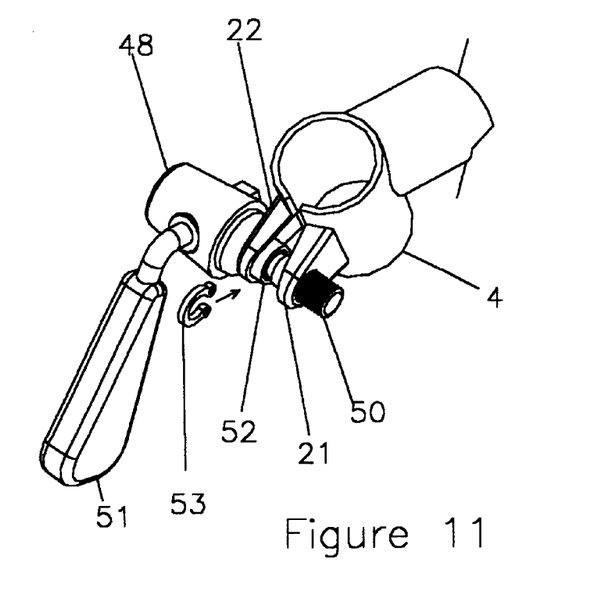
FIG. 11 shows yet a further embodiment of the invention wherein the quick release mechanism is capable of actively applying both a clamping force and a force in the opposite direction to the clamping force; and, FIG. 12 is an exploded view of the embodiment of the invention shown in FIG. 11.
Figure 12:
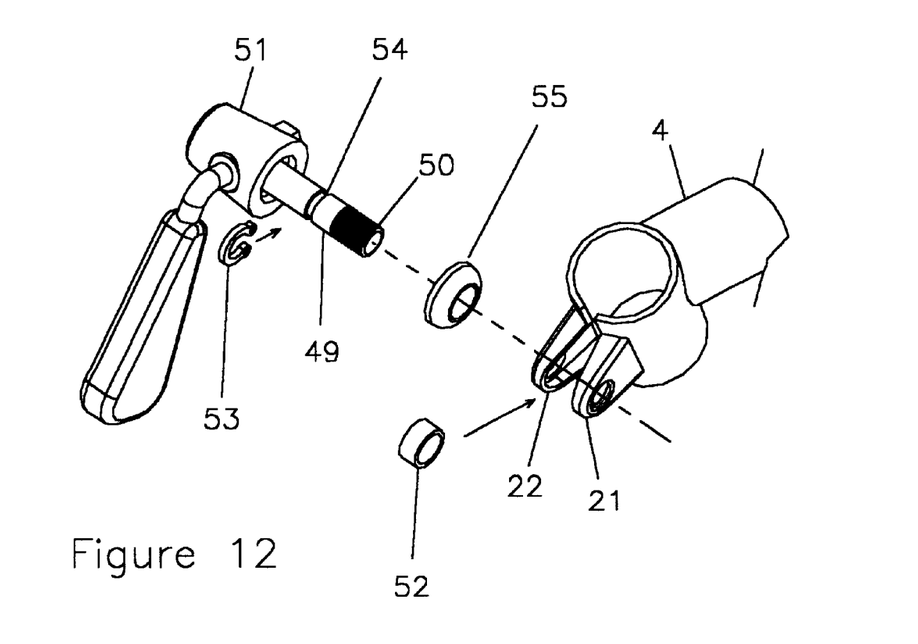

FIGS. 11 and 12 show an embodiment of the invention where the quick release mechanism is indicated by reference numeral 48. Quick release mechanism 48 is comprised generally of an elongate bolt member 49 that is receivable within the bores extending through lugs 21 and 22 of clamp 4. Bolt member 49 has a first threaded end 50 that engages corresponding threads within the bore passing through lug 21 and thereby secures the bolt member to the lug, and hence clamp 4. Quick release clamping mechanism 48 further includes a tensioning member 51 situated at end of bolt member 49 opposite to threaded end 50. Tensioning member 51 is operable between an engaged and a disengaged position such that when it is in its engaged position it bears against lug 22 to effectively draw threaded end 50 of bolt member 49, together with lug 21, toward lug 22 thereby compressing clamp 4. When it is disengaged, tensioning member 51 releases the force tending to draw lugs 21 and 22 toward one another and thereby releasing the compressive force applied to clamp 4. In the embodiment shown in FIGS. 11 and 12 a washer 55 is placed over bolt member 49 between tensioning member 51 and lug 22 to assist in the transference of force therebetween and to reduce frictional engagement of the tensioning member with lug 22.

It will, of course, be appreciated by those skilled in the art that a variety of different mechanical structures could be utilized for tensioning member 51. For example, tensioning member 51 may be comprised of a cam actuated member that is activated through rotation of an attached handle, as described above and as shown in detail in FIGS. 3a and 3b. In an alternate embodiment tensioning member 51 could be comprised of a handle member having a cammed exterior surface that is connected to bolt member 49 such that rotation of the handle causes its crammed surface to effectively either lengthen or shorten bolt member 49. This alternate embodiment is also described above and is shown in FIG. 3c. In either instance the overall function of quick release mechanism 48 will be essentially the same.

In order to prevent the over compressing of clamp 4 and a potential bending or destruction of lugs 21 and 22, elongate bolt member 49 includes an enlarged diameter portion that is situated between lugs 21 and 22 when bolt member 49 is received through the bores in the respective lugs with threaded end 50 engaging the threaded bore through lug 21. The enlarged diameter portion limits movement of the lugs toward one another beyond a predetermined distance.

In one preferred embodiment of the invention the enlarged diameter portion comprises a spacer 52. As shown in both FIGS. 11 and 12, spacer 52 is preferably received over bolt member 49 and retained in place along the longitudinal axis of the bolt by means of a retaining ring 53. Retaining ring 53 can take a variety of different forms, however, in the embodiment shown in FIGS. 11 and 12 retaining ring 53 is comprised of a spring clip that is received within a circumferential slot 54 about the exterior surface of bolt member 49. With retaining ring 53 in place about bolt member 49, spacer 52 will be prevented from moving longitudinally along the exterior surface of the bolt member. This described configuration will allow quick release mechanism 48 to be assembled easily and without the use of tools or complex equipment.

Once assembled, operation of tensioning member 51 from its disengaged to its engaged position will thus cause lugs 21 and 22 to be drawn together and will compress clamp 4. The positioning of spacer 52 between the respective lugs will limit the movement of the lugs toward one another. However, an understanding of the structure of this embodiment of the invention will make it apparent that the amount of compressive force that can be applied to the lugs by tensioning member 51 can be adjusted through threading elongate bolt member 49 into or out of the threaded bore within lug 21. That is, threading bolt member 49 into lug 21 will have the tendency of shortening the effective length of bolt member 49 and cause an enhanced amount of compressive force to be applied to the respective lugs upon the operation of tensioning member 51. On the other hand, rotating bolt member 49 in the opposite direction will cause threaded end 50 to be retracted from lug 21, will effectively lengthen bolt member 49, and will reduce the amount of compressive force that can be applied to clamp 4 by tensioning member 51.

It will also be appreciated that as bolt member 49 is threaded out of lug 21, spacer 52 (which acts as an enlarged diameter portion of bolt member 49 that is held in place by retaining ring 53) will bear against the interior surface of lug 22. As bolt member 49 is further threaded out of lug 21 the bearing of spacer 52 against lug 22 will have the effect of driving lugs 21 and 22 away from one another, thereby increasing their separation and effectively opening clamp 4.

Quick release clamping mechanism 48 thus provides a means to not only actively secure an objection within clamp 4 but also provides a mechanism to actively apply a force in the opposite direction to allow clamp 4 to be opened such that an object secured therein can be easily adjusted or removed. Through the described structure an operator is able to positively control the position of lugs 21 and 22, providing an enhanced degree of freedom with respect to the size of object that can be secured in clamp 4 and minimizing tolerancing problems that may otherwise occur between the outside diameter of an object to be secured and the interior dimensions of clamp 4.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. A quick release for a clamping mechanism that may be secured about a structural member of a bicycle or other device, the mechanism including a first clamp having first and second outwardly projecting lugs that may be drawn together toward one another to compress the clamp about the structural member, each of the lugs having a bore extending therethrough and positioned upon said first clamp such that the bores are generally aligned with one another, the bore in the first lug internally threaded, the quick release mechanism comprising:

an elongate bolt member receivable through said bores in said lugs, said bolt member having a first threaded end that threadably engages the threaded bore through the first lug to secure said bolt member thereto; and, a tensioning member, said tensioning member operable between an engaged and a disengaged position, when in said engaged position said tensioning member bearing against said second lug and drawing said threaded end of said bolt member and said first lug to which it is secured toward said second lug thereby compressing the first clamp, when in said disengaged position said tensioning member releasing said force drawing said first lug toward said second lug, the compressive force applied by said tensioning member adjustable through threading said first end of said bolt member into or out of the threaded bore through the first lug, said bolt member further including an enlarged diameter portion, said enlarged diameter portion situated between the first and second lugs when said bolt member is received through the bores in the lugs, said enlarged diameter portion limiting movement of the lugs toward one another beyond a predetermined distance, said enlarged diameter portion bearing against the second lug when said bolt member is threaded out of the bore through the first lug thereby driving the first and second lugs away from one another and expanding the first clamp.

2. The device as claimed in claim 1 wherein said enlarged diameter portion comprises a spacer sleeve receivable over said elongate bolt member.

3. The device as claimed in claim 2 including a retaining ring, said retaining ring securable about said bolt member to axially offset said spacer sleeve from the first lug when said bolt member is received through the bores in the first and second lugs.

4. The device as claimed in claim 1 wherein said tensioning member is a cam actuated clamping mechanism.

5. A mounting apparatus for detachably securing an object to a bicycle, a tricycle, or other device, the apparatus comprising:
- a first clamp securable to a structural feature of a bicycle, tricycle or other device;
- a second clamp releasably securable to an object to be attached to the bicycle, tricycle or other device; and,
- a connecting member joining said first clamp to said second clamp in a fixed spaced-apart relationship so as to offset the object secured to the bicycle or other device by said second clamp at a fixed distance from the structural feature to which said first clamp may be attached, said connecting member joining said second clamp to said first clamp at an inclined angle such that said object releasably secured to said second clamp is held in an inclined configuration relative to said first clamp.

6. The device as claimed in claim 5 wherein said object is a training support bar, said training support bar including an elongate handle to assist in providing balance and stability to a rider on a bicycle or tricycle.

7. The device as claimed in claim 6 wherein said handle has a first end receivable within said opening in said second clamp, said first end of said handle including an outwardly extending tab receivable within a correspondingly dimensioned channel within said second clamp, when said tab is received within said channel said tab assisting in preventing rotational movement of said handle relative to said mounting apparatus.

8. The device as claimed in claim 5 wherein said object is a water bottle holder, a carrier, a fender, or a wagon tongue.

9. The device as claimed in claim 5 wherein said first clamp is in the form of a compressible sleeve, said sleeve having first and second outwardly projecting lugs that may be drawn toward one another to compress said sleeve, each of said lugs having a bore extending therethrough and positioned about said sleeve such that the bores are generally aligned with one another, said bore through said first lug having an internal thread.

10. The device as claimed in claim 9 including a quick release clamping mechanism that includes an elongate bolt member receivable through said bores in said first and second lugs, said bolt member having a first threaded end that threadably engages said threaded bore through said first lug, said quick release clamping mechanism having an engaged and disengaged position, when in said engaged position said clamping mechanism drawing said first and second lugs together to compress said sleeve, when in said disengaged position said quick release clamping mechanism releasing said compressive force applied to said lugs, the compressive force applied by said quick release clamping mechanism adjustable through threading said first end of said bolt member into or out of said threaded bore in said first lug.

11. The device as claimed in claim 10 wherein said bolt member further includes an enlarged diameter portion, said enlarged diameter portion situated between said first and second lugs when said bolt member is received through said bores in said hugs, said enlarged diameter portion limiting movement of said lugs toward one another beyond a predetermined distance, said enlarged diameter portion bearing against said second lug when said bolt member is threaded out of said bore through said first lug thereby driving said first and second lugs away from one another and expanding said sleeve.

12. The device as claimed in claim 11 wherein said first clamp is adapted to be attached to the seat post of a bicycle or tricycle.

13. The device as claimed in claim 12 wherein said connecting member is of a length such that when said first clamp is attached to the seat post of a bicycle or tricycle said second clamp is positionable beneath the rearward portion of the bicycle's or the tricycle's seat without extending in a vertical plane beyond the rear most portion of the seat.

14. The device as claimed in claim 11 wherein said quick release mechanism is a cam actuated bolt member.

15. A mounting apparatus for detachably securing a training support bar to a bicycle or a tricycle, the training support bar having an elongate handle with a first end securable to the mounting apparatus, the training support bar assisting in providing balance and stability to a rider on the bicycle or tricycle, the mounting apparatus comprising:
- a first clamp releasably securable to the frame or a structural member of the bicycle or tricycle;
- a second clamp releasably securable to the training support bar; and,
- a connecting member joining said first clamp to said second clamp in a fixed and spaced-apart relationship so as to position the training support bar at a fixed distance from the frame of the bicycle or tricycle to which said first clamp is attached, said connecting member including a flange portion that is attachable to the frame or a structural member of the bicycle or tricycle such that said first clamp and said flange portion together secure said mounting apparatus to the bicycle or tricycle and together resist torsional loading applied to said mounting apparatus by the training support bar and movement of said mounting apparatus relative to the bicycle or tricycle.

16. The device as claimed in claim 15 wherein said second clamp is in the form of a sleeve compressively receivable about said first end of said training support bar, said sleeve having first and second outwardly projecting lugs that may be drawn toward one another to compress said sleeve about said first end of said training support bar, each of said lugs having a bore extending therethrough and positioned about said sleeve such that said bores are generally aligned with one another, said bore through said first lug having an internal thread.

17. The device as claimed in claim 16 including a quick release clamping mechanism that includes an elongate bolt member receivable through said bores in said first and second lugs of said second clamp, said bolt member having a first threaded end that threadably engages said threaded bore through said first lug, said quick release clamping mechanism operable to apply and release a compressive force to said lugs and thereby releasably secure said first end of said training support bar within said second clamp, the compressive force applied by said quick release clamping mechanism adjustable through threading said first end of said bolt member into or out of said threaded bore in said first lug.

18. The device as claimed in claim 17 wherein said bolt member further includes an enlarged diameter portion, said enlarged diameter portion situated between said first and second lugs when said bolt member is received through said bores in said lugs, said enlarged diameter portion limiting movement of said lugs toward one another beyond a predetermined distance, said enlarged diameter portion bearing against said second lug when said bolt member is threaded out of said bore through said first lug thereby driving said first and second lugs away from one another and expanding said sleeve.

19. The device as claimed in claim 17 wherein said connecting member joins said first clamp to said second clamp at an angle such that the training support bar, when releasably secured by said second clamp, is held in a generally vertical orientation when said first clamp is secured to the seat post of a bicycle or tricycle.

20. The device as claimed in claim 17 wherein said first clamp is adapted to be attached to the seat post of the bicycle or tricycle and said connecting member is of length such that when said first clamp is attached to the seat post of the bicycle or tricycle said connecting member off-sets said second clamp from said first clamp to allow the training support bar to be releasably secured by said second clamp without interference with the bicycle's or the tricycle's seat when said second clamp is positioned beneath the rearward portion of the seat.

21. The device as claimed in claim 17 wherein the first end of the training support bar includes an outwardly extending tab receivable within a channel within said second clamp, when said tab is received within said channel said tab assisting in preventing rotational movement of the training support bar relative to said mounting apparatus.

22. A mounting apparatus for detachably securing an object to a bicycle or other device, the mounting apparatus comprising:

a first clamp releasably securable to a structural member of the bicycle or other device;

a second clamp releasably securable to said object to be secured to the bicycle or other device; and, a connecting member joining said first clamp to said second clamp in a fixed and spaced-apart relationship so as to position the object at a fixed distance from the bicycle or other device, said connecting member including a flange portion that is attachable to a structural member of the bicycle or other device such that said first clamp and said flange portion together secure said mounting apparatus to the bicycle or other device and together resist torsional loading applied to said mounting apparatus by the object.

23. The device as claimed in claim 22 wherein said connecting member joins said first clamp to said second clamp at an angle such that the object releasably secured by said second clamp is held in an inclined configuration relative to said first clamp.

* * * * *